United States Patent [19]

Moffat et al.

[11] Patent Number: 4,605,196

[45] Date of Patent: Aug. 12, 1986

[54] SOLENOID OPERATED VALVE

[75] Inventors: Allen J. Moffat, Wilmington; Tom Ours, Xenia, both of Ohio

[73] Assignee: Airmatic-Allied, Inc., Wilmington, Ohio

[21] Appl. No.: 623,099

[22] Filed: Jun. 21, 1984

[51] Int. Cl.⁴ ............................................ F16K 25/00
[52] U.S. Cl. ........................................ 251/84; 251/85; 251/86; 251/129.15; 251/129.20; 137/625.27
[58] Field of Search ................... 251/84, 85, 138, 40, 251/86, 187, 186, 129; 137/625.24, 625.65, 625.27

[56] References Cited

U.S. PATENT DOCUMENTS

| 2,354,960 | 8/1944 | Morehouse | 251/84 X |
| 2,687,870 | 8/1954 | Matthews | 251/138 X |
| 3,303,854 | 2/1967 | Churchill | 137/625.27 X |
| 3,310,069 | 3/1967 | Hoffman | 251/187 X |
| 3,759,293 | 9/1973 | Tanaka | 251/85 X |
| 3,815,633 | 6/1974 | Greenwood et al. | 137/625.27 |
| 4,458,710 | 7/1984 | Weaver | 251/86 X |

Primary Examiner—Larry Jones
Attorney, Agent, or Firm—Woodling, Krost, Rust

[57] ABSTRACT

An improved pin actuated valve wherein the pins are split to separate the actuation function from the alignment function of the pins.

6 Claims, 2 Drawing Figures

SOLENOID OPERATED VALVE

This invention relates to an improved solenoid operated valve.

It is an object of this invention to improve the operating efficiency and speed of solenoid operated valves.

It is an object of this invention to simplify the construction of the solenoid operated valves.

Other advantages of this invention will be apparent from the drawings in which.

Figure 1:
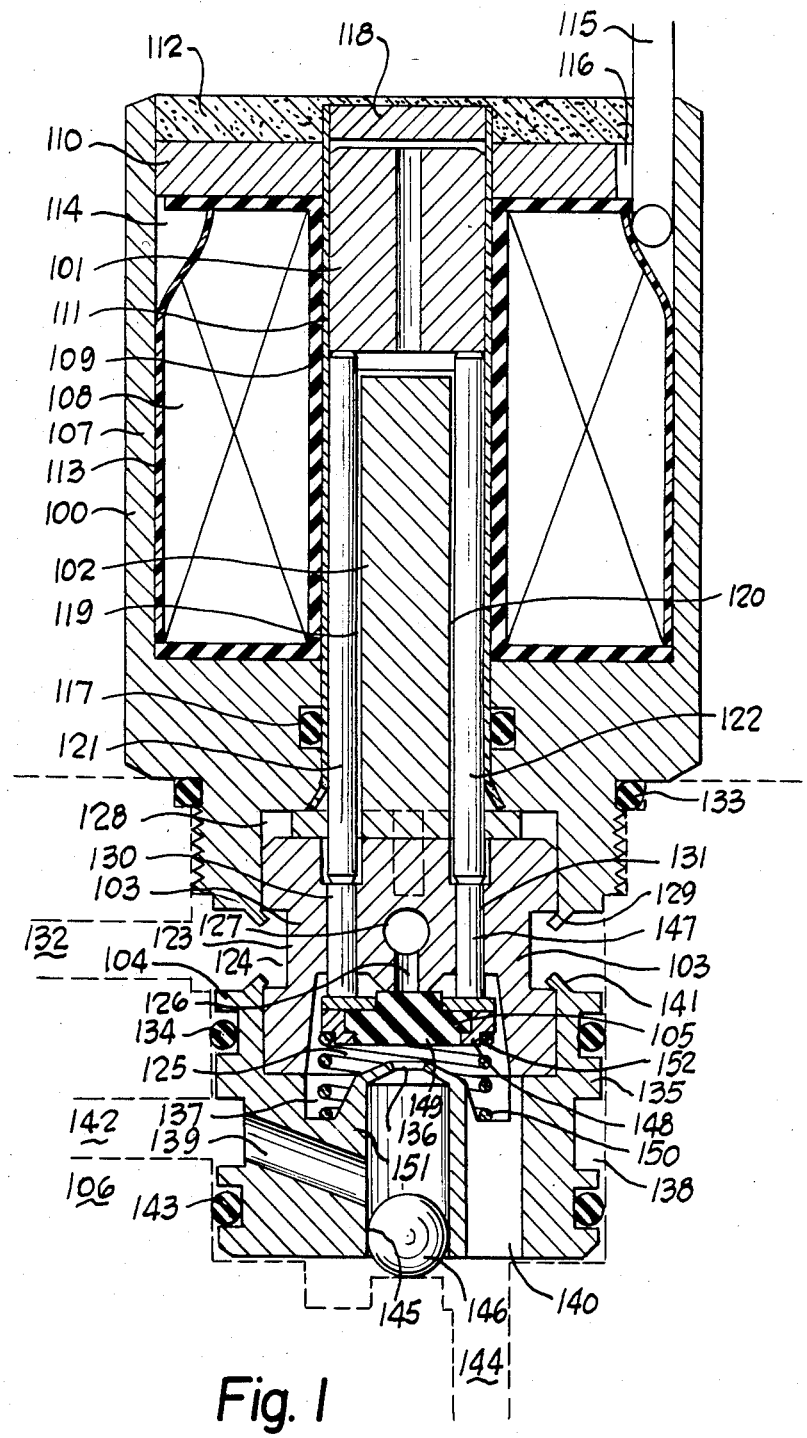
FIG. 1 is a cutaway side view of an electrically operated solenoid valve incorporating the invention of this application.
Figure 2:
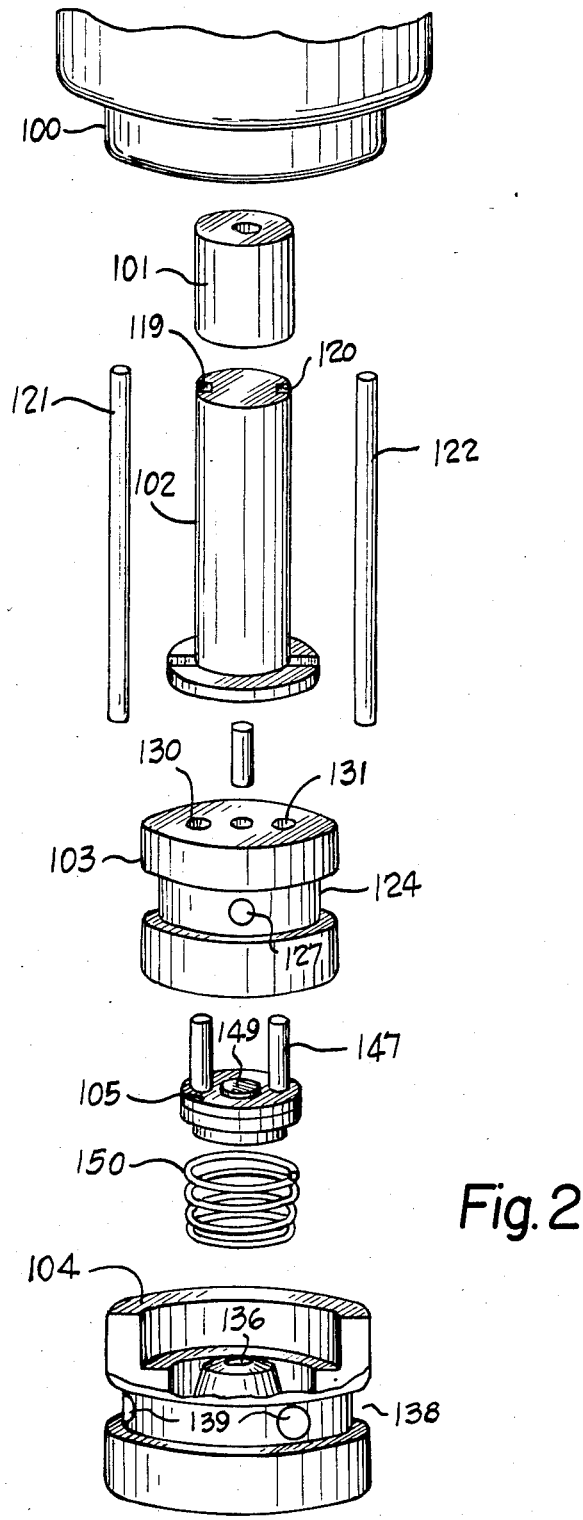
FIG. 2 is an expanded unassembled perspective view of the main operative parts of the valve of FIG. 1.

The electrically operated solenoid valve is disclosed in FIGS. 1 and 2. This disclosed valve has a solenoid section 100, a plunger 101, a magnetic stop 102, a pressure insert 103, an exhaust section 104 and a valve mechanism 105. The particular valve shown is designed to operate as a plug-in valve in cooperation with a manifold 106 (shown is dotted lines in FIG. 1).

The solenoid section 100 of the disclosed valve includes a body 107, a solenoid coil 108, a solenoid bobbin 109, a flux ring 110, a plunger guide 111, and an end cap 112. The solenoid coil 108 is wound onto the solenoid bobbin 109. It is sealed by seal 113. A small unsymmetrical space 114 allows for the proper electrical termination, in this case wires 115. The solenoid coil 108-bobbin 109 assembly is within the body 107 of the solenoid section 100. The magnetic flux ring 110 is located on top of the solenoid coil 108-bobbin 109 assembly. A small cutout 116 allows the wires 115 to pass through the flux ring 110. The plunger guide 111 extends upwards through the body 107 of the solenoid section 100, the solenoid coil 108-bobbin 109 assembly and the flux ring 110. An O-ring 117 prevents leakage between the plunger guide 111 and the body 107 of the solenoid section 100. An end cap 118 seals the end of the plunger guide 111. The open end of the body 107 of the solenoid section 100 is sealed with an epoxy resin (end cap 112). The solenoid section 100 is thus encapsulated into a single fluid tight unit. The solenoid coil 108 is protected from all contaminants and fluid leakage.

The magnetic stop 102 is located within the plunger guide 111 of the solenoid section 100. The magnetic stop 102 confines the plunger 101 into a small space next to the end cap 118 of the plunger guide 111. The plunger 101 is free to move axially of itself upon energization of the surrounding solenoid coil 108. Two opposing square channels 119,120 are cut into the sides of the magnetic stop 102. These square channels 119,120 are a little oversize for the actuating pins 121,122 they receive. The pins 121,122 extend a little below the bottom of the magnetic stop 102 for connection to the valve mechanism 105. Fluid is free to travel throughout the interior of the plunger guide 111 to cool the plunger 101 and the magnetic stop 102.

The pressure insert 103 of the valve includes a body 123, a surrounding inlet channel 124, a valve disc cavity 125, a valve opening 126 and radially extending passages 127. The pressure insert 103 fits partially into a complementary cavity 128 in the body 107 of the solenoid section 100. A small pin aligns the pieces. A 360° lip 129 extending from the body 107 of the solenoid section 100 is formed to retain the pressure insert 103 in place. (The pressure insert 103 itself in turn retains the magnetic stop 102 in place.) Two through holes 130,131 in the body 123 of the pressure insert 103 line up with the two channels 119,120 in the magnetic stop 102. The actuating pins 121,122 extend into these holes 130,131. Note that the top part of the through holes 130,131 are of a larger diameter than the lower part of the through holes 130,131. The inlet channel 124 of the pressure insert 103 is in constant communication with an inlet pressure passage 132 of the manifold 106. An O-ring 133 prevents inlet fluid leakage between the body 107 of the solenoid section 100 and the manifold 106. A second O-ring 134 prevents inlet fluid leakages to the exhaust area (to be later described). The three radially extending passages 127 transfer the fluid from this channel 124 to the valve opening 126 in the valve disc cavity 125.

The exhaust section 104 of the valve includes a body 135, a valve opening 136, a cavity 137, a surrounding exhaust channel 138, radially extending passages 139 and a pilot passage 140. The pressure insert 103 fits partially into the cavity 137 in the exhaust section 104. A second 360° lip 141 extending from the exhaust section 104 is formed to retain the exhaust section 104 in place in respect to the pressure insert 103. The exhaust channel 138 of the exhaust section 104 is in constant communication with an exhaust passage 142 of the manifold 106. An O-ring 143 prevents exhaust fluid leakage to the pilot area (to be later described). Three radially extending passages 139 transfer fluid from the valve opening 136 to the exhaust channel 138 (and the exhaust passage 142). The pilot passage 140 extends through the body 135 of the exhaust section 104 to connect the valve cavity 125 to the pilot passage 144 in the manifold 106. (To facilitate manufacture of the valve, a hole 145 is made in the exhaust section 104. This hole 145 is later plugged by a press fit ball 146.)

The valve mechanism 105 of the valve includes a two-legged spider 147, a spring guide washer 148, a valve seal 149 and a spring 150. The legs of the spider 147 are preferably brazed to the body of the spider. In a variation the legs would be unattached to the spider. The valve mechanism 105 is located within the valve disc cavity 125 with the legs of the spider 147 extending into the holes 130,131 in the pressure insert 103. The holes 130,131 are a little larger diameter than the legs of the spider 147. The holes 130,131 and legs combine to guide the valve mechanism 105. The spring 105 extends between the exhaust section 104 and the spring guide washer 148. Due to the diameter of the uplifted part 151 of the exhaust section 104 (surrounding the valve opening 136) the bottom of the spring 150 does not shift. A corresponding groove 152 locates the spring 150 in respect to the spring guide washer 148. The valve seal 149 is trapped between the spider 147 and the spring guide washer 148. (The spider 147 and the spring guide washer 148 are normally fastened together so that the spider 147, seal 149 and the washer 148 act as a single unit.) In the unattached leg variation the spring 150 locates the seal 149 in respect to the rest of the valve.

The disclosed valve is shown as a normally closed valve (inlet pressure shut-off): the valve seal 149 closes the valve opening 126. Fluid (if any) travels through the valve between the pilot 144 and exhaust 142. Due to the tight fit of the legs of the spider 147 into holes 130,131 of the pressure insert 123 the seal 149 does not shift or vibrate because of this fluid flow. The pressure of the spring 150 retains the valve seal 149 against the valve opening 126.

Upon energization of the solenoid coil 108 the plunger 101 is pulled down to the magnetic stop 102. The pins 121,122 pass this force to the legs of the spider 147. This causes the valve mechanism 105 to move downward against the pressure of spring 150 to open the valve opening 126 and close the valve opening 136. Due to the separation of the legs of the spider 147 from the pins 121, 122 the valve mechanism 105 moves like a piston without binding; any misalignment between the holes 130,131 in the pressure insert and the channels 119,120 in the magnetic stop 102 are compensated for. Due to the tight fit of the legs of the spider into holes 130,131 the valve mechanism does not vibrate due to the flow of fluid between the inlet 132 and pilot 144 areas.

Upon de-energization of the solenoid coil 108, the pressure of the spring 150 returns the valve mechanism 105 to its initial resting position (closing valve opening 126).

The valve is then ready for energization again.

The separation of the actuating pins 121,122 from the legs of the spider 147 allows one to maximize the operating efficiency/performance of the valve and minimize the potential problems. The legs of the spider 147 can be fitted with the holes 130,131 in the pressure insert 103 without worrying about misalignment binding. The actuating pins 121,122 serve only to longitudinally pass the actuation forces from the plunger 101 to the spider 147. The actuating pins 121,122 have clearance to move radially (clearance which is present about the legs of the spider 147 would compromise performance).

Although this invention has been described with some certainty it is recognized that numerous changes can be made without deviating from the invention as hereinafter claimed.

What is claimed is:

1. An improvement for a solenoid operated valve having two pins operatively connecting a valve operating mechanism with a valve seal, the two pins having an axis and being in containment cavities, connected to the valve seal, the improvement comprising the two pins being split in a direction generally perpendicular to their respective axis into actuation pins and guide legs, the effective diameter of the containment cavities being reduced surrounding said guide legs, said guide legs guiding the valve seal, and said actuating pins transferring the valve operating forces between the valve operating mechanism and said guide legs, said split separating the actuating function of the pins from the guiding function of the pins.

2. In a valve having a fluid port valve seal, the improvement comprising a plunger, means to confine said plunger allowing movement thereof, means to selectively move said plunger, guide legs, said guide legs being connected to the valve seal, guide leg containment means, said guide legs and said guide leg containment means cooperating to guide the valve seal, actuation pins, actuation pin containment means, said actuation pins being generally longitudinally in line with said guide legs, and said actuation pins extending between said plunger and said guide legs to pass the valve operative forces therebetween and thus to the valve seal.

3. The improved valve of claim 2 characterized in that said actuation pin containment means allows for some non-axial movement of said actuation pins so as to compensate for any misalignment between said actuation pin containment means and said guide leg containment means.

4. In a valve having a fluid port and a fluid port valve, the improvement comprising a plunger, means to confine said plunger allowing the axial movement thereof, means to selectively axially move said plunger, a spider, said spider having a body portion and guide legs, said spider being operatively connected to the valve at said body portion with said guide legs being directed towards said plunger, said guide legs of said spider bypassing the fluid port, actuation pins, said actuation pins being located between said plunger and said guide legs of said spider, said actuation pins being generally in line with said guide legs, and said actuation pins passing the axial movement of said plunger to said guide legs of said spider and thus the valve.

5. In a valve having a fluid port and axially operated fluid port valve, the improvement comprising a plunger, means to confine said plunger allowing the axial movement thereof, means to selectively axially move said plunger, a spider, said spider having a body portion and guide legs, said spider being operatively connected to the valve at said body portion with said guide legs being directed towards said plunger, said guide legs of said spider bypassing the fluid port, guide leg containment means, said guide legs and said guide leg containment means cooperating to guide said spider for axial movement thereof, actuation pins, said actuation pins being located between said plunger and said guide legs of said spider, said actuation pins being generally in line with said guide legs, actuation pin containment means, said actuation pin containment means allowing for some non-axial movement of said actuation pins so as to compensate for any misalignment between said actuation pin containment means and said guide leg containment means, and said actuation pins passing the axial movement of said plunger to said guide legs of aid spider and thus the valve.

6. An improvement for a solenoid operated valve having pins operatively connecting a valve operating mechanism with a valve seal, the pins having an axis and being in containment cavities, connected to the valve seal, the improvement comprising the pins being split in a direction generally perpendicular to their respective axis into actuation pins and guide legs, the containment cavities closely surrounding said guide legs, said guide legs guiding the valve seal, and said actuation pins transferring the valve operating forces between the valve operating mechanism and said guide legs, said split separating the actuating function of the pins from the guiding function of the pins.

* * * * *